US012756977B2

(12) United States Patent
Seo et al.

(10) Patent No.: US 12,756,977 B2
(45) Date of Patent: Oct. 6, 2026

(54) DEVICE AND METHOD FOR EXPANDING 7-CHANNEL AUDIO BY USING RADIO TRANSMISSION

(71) Applicant: SAMSUNG ELECTRONICS CO., LTD., Suwon-si (KR)

(72) Inventors: Jehwan Seo, Suwon-si (KR); Yongjin Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 112 days.

(21) Appl. No.: 18/733,369

(22) Filed: Jun. 4, 2024

(65) Prior Publication Data

US 2024/0334127 A1 Oct. 3, 2024

Related U.S. Application Data

(63) Continuation of application No. PCT/KR2022/016392, filed on Oct. 26, 2022.

(30) Foreign Application Priority Data

Jan. 3, 2022 (KR) ........................ 10-2022-0000432

(51) Int. Cl.
*H04R 3/12* (2006.01)
*H04R 5/04* (2006.01)
*H04S 3/00* (2006.01)

(52) U.S. Cl.
CPC ................. *H04R 3/12* (2013.01); *H04R 5/04* (2013.01); *H04S 3/008* (2013.01); *H04R 2420/07* (2013.01); *H04S 2400/01* (2013.01)

(58) Field of Classification Search
CPC ... H04R 3/12; H04R 3/14; H04R 5/04; H04R 1/02; H04S 3/008; H04L 65/40; H04W 4/02

(Continued)

(56) References Cited

U.S. PATENT DOCUMENTS

2001/0017849 A1* 8/2001 Campanella ........... H04H 40/90 370/522
2001/0040928 A1* 11/2001 Sakoda ................... H04L 5/023 375/267

(Continued)

FOREIGN PATENT DOCUMENTS

CN 105992105 A 10/2016
CN 106792333 A 5/2017

(Continued)

OTHER PUBLICATIONS

International Search Report (PCT/ISA/210) issued on Feb. 2, 2023 by the International Searching Authority in International Patent Application No. PCT/KR2022/016392.

(Continued)

*Primary Examiner* — Rasha S Al Aubaidi
(74) *Attorney, Agent, or Firm* — Sughrue Mion, PLLC

(57) ABSTRACT

There is provided an audio system and a method for expanding 7-channel audio using wireless transmission. The method includes transmitting first audio data corresponding to a plurality of first channels, transmitting second audio data corresponding to a plurality of second channels, receiving and extracting, by a first reception circuit, third audio data corresponding to three channels among the plurality of first channels, receiving and extracting, by the second reception circuit, fourth audio data corresponding to one channel among the plurality of first channels, and receiving and extracting, by the third reception circuit, fifth audio data corresponding to three channels among the plurality of second channels.

18 Claims, 4 Drawing Sheets

(58) Field of Classification Search
USPC .............................................. 318/92, 94, 98
See application file for complete search history.

(56) References Cited

U.S. PATENT DOCUMENTS

| | | | | |
|---|---|---|---|---|
| 2003/0035556 | A1* | 2/2003 | Curtis | H04S 3/00 381/104 |
| 2006/0153155 | A1 | 7/2006 | Jacobsen et al. | |
| 2006/0232704 | A1 | 10/2006 | Sutardja | |
| 2008/0247554 | A1 | 10/2008 | Caffrey | |
| 2012/0020479 | A1 | 1/2012 | Zhang | |
| 2019/0387344 | A1 | 12/2019 | Kim et al. | |
| 2020/0351602 | A1 | 11/2020 | Jarvis et al. | |

FOREIGN PATENT DOCUMENTS

| | | | |
|---|---|---|---|
| CN | 109714691 | A | 5/2019 |
| CN | 111970613 | A | 11/2020 |
| JP | 2012-505616 | A | 3/2012 |
| KR | 10-0703222 | B1 | 4/2007 |
| KR | 10-1027968 | B1 | 4/2011 |
| KR | 10-1087082 | B1 | 11/2011 |
| KR | 10-2018-0012744 | A | 2/2018 |
| KR | 10-2021-0008779 | A | 1/2021 |

OTHER PUBLICATIONS

Written Opinion (PCT/ISA/237) issued on Feb. 2, 2023 by the International Searching Authority in International Patent Application No. PCT/KR2022/016392.

Communication issued on Oct. 30, 2025 by the Korean Intellectual Property Office in Korean Patent Application No. 10-2022-0000432.

Communication dated Jan. 30, 2025, issued by the European Patent Office in European Application No. 22916343.1.

* cited by examiner

DEVICE AND METHOD FOR EXPANDING 7-CHANNEL AUDIO BY USING RADIO TRANSMISSION

CROSS-REFERENCE TO RELATED APPLICATION(S)

This application is a bypass continuation of International Application No. PCT/KR2022/016392, filed on Oct. 26, 2022, which is based on and claims priority to Korean Patent Application No. 10-2022-0000432, filed on Jan. 3, 2022, in the Korean Intellectual Property Office, the disclosures of which are incorporated by reference herein in their entireties.

BACKGROUND

1. Field

The disclosure relates to a system, a device and a method for audio processing, in particular, a system, a device and a method for expanding 7-channel audio using wireless transmission.

2. Description of Related Art

Due to the recent development of various video equipment and audio systems, home media entertainment systems (e.g., a home theater) that recreate theater-like effects are becoming widely available. Such home media entertainment systems may include video equipment such as projectors, projections, plasma display panels (PDPs), and digital televisions, as well as digital theater systems (hereinafter "DTS") with standard 5.1 channels or more, audio visual (AV) receivers/amplifiers that support Dolby Digital, speaker systems with 5.1 channels or more, and digital video disc (DVD) players. Video equipment included in the home theater provides a clear picture like a theater, and the AV receiver/amplifier and speaker system provide magnificent sound that may be sensed in a home theater.

The home theater may be broadly divided into a video part and an audio part, and one or more aspects of the disclosure may specifically relate to an audio system corresponding to the audio part. For example, the audio system is referred to as a multi-channel audio system, since the audio system supports multiple channels of 5.1 or higher. A multi-channel audio system includes an AV receiver/amplifier for decoding a multi-channel audio stream and a speaker system for outputting the decoded multi-channel audio stream as sound. An AV receiver/amplifier is a device for decoding and amplifying an input audio stream and providing the audio stream to a speaker through which an audience may hear. A speaker system includes a center speaker, main speaker or front speaker, a rear speaker or surround speaker, and a sub-woofer speaker. For example, in the case of standard 5.1 channels, the center speaker includes 1 channel, the main (front) speaker includes 2 channels, the rear (surround) speaker includes 2 channels, and the subwoofer speaker includes 0.1 channels. Recently, the speaker system has continued to be developed into 6.1 channels and 7.1 channels.

Currently, the maximum number of channels transmitted through wireless communication is 3 to 5 channels.

However, in order to provide richer audio experience, it is advantageous to provide audio through more channels, and thus, a method of expanding more channels through wireless communication is required.

SUMMARY

According to one or more aspects of the disclosure, audio data corresponding to seven channels may be transmitted wirelessly using two transmission modules.

According to one or more aspects of the disclosure, by configuring a transmission module and a reception module in a same hardware module, a pointing direction of a remote control may be confirmed and a registered device in the pointing direction may be controlled, thereby increasing productivity and reducing material costs.

According to an aspect of the disclosure, there is provided an audio system including: a main audio device including: a first transmission circuit configured to transmit a first wireless audio signal including first audio data corresponding to a plurality of first channels, and a second transmission circuit configured to transmit a second wireless audio signal including second audio data corresponding to a plurality of second channels different from the plurality of first channels; a first auxiliary audio device including a first reception circuit configured to: receive the first wireless audio signal from the first transmission circuit and extract third audio data corresponding to three channels among the plurality of first channels from the first wireless audio signal; a second auxiliary audio device including a second reception circuit configured to: receive the first wireless audio signal from the first transmission circuit and extract fourth audio data corresponding to one channel among the plurality of first channels, different from the three channels among the plurality of first channels, from the first wireless audio signal; and a third auxiliary audio device including a third reception circuit configured to: receive the second wireless audio signal from the second transmission circuit and extract fifth audio data corresponding to three channels among the plurality of second channels from the second wireless audio signal.

According to another aspect of the disclosure, there is provided a method of expanding 7-channel audio using wireless transmission in an audio system, the method including: establishing a wireless communication between a first transmission circuit and a first reception circuit, establishing a wireless communication between the first transmission circuit and a second reception circuit, and establishing a wireless communication between a second transmission circuit and a third reception circuit; transmitting, by the first transmission circuit, a first wireless audio signal including first audio data corresponding to a plurality of first channels; transmitting, by the second transmission circuit, a second wireless audio signal including second audio data corresponding to a plurality of second channels different from the plurality of first channels; receiving, by the first reception circuit, the first wireless audio signal from the first transmission circuit and extracting third audio data corresponding to three channels among the plurality of first channels from the first wireless audio signal; receiving, by the second reception circuit, the first wireless audio signal from the first transmission circuit and extracting fourth audio data corresponding to one channel among the plurality of first channels, different from the three channels among the plurality of first channels, from the first wireless audio signal; and receiving, by the third reception circuit, the second wireless audio signal from the second transmission circuit and extracting fifth audio data corresponding to three channels among the plurality of second channels from the second wireless audio signal.

The audio system may transmit audio data corresponding to seven channels wirelessly.

In addition, the first transmission circuit, the second transmission circuit, the first reception circuit, the second reception circuit, and the third reception circuit are all configured in a same module, thereby having the effect of increasing productivity and reducing material costs. For example, the first transmission circuit, the second transmission circuit, the first reception circuit, the second reception circuit, and the third reception circuit may be provided in a same housing.

DETAILED DESCRIPTION

Figure 1:
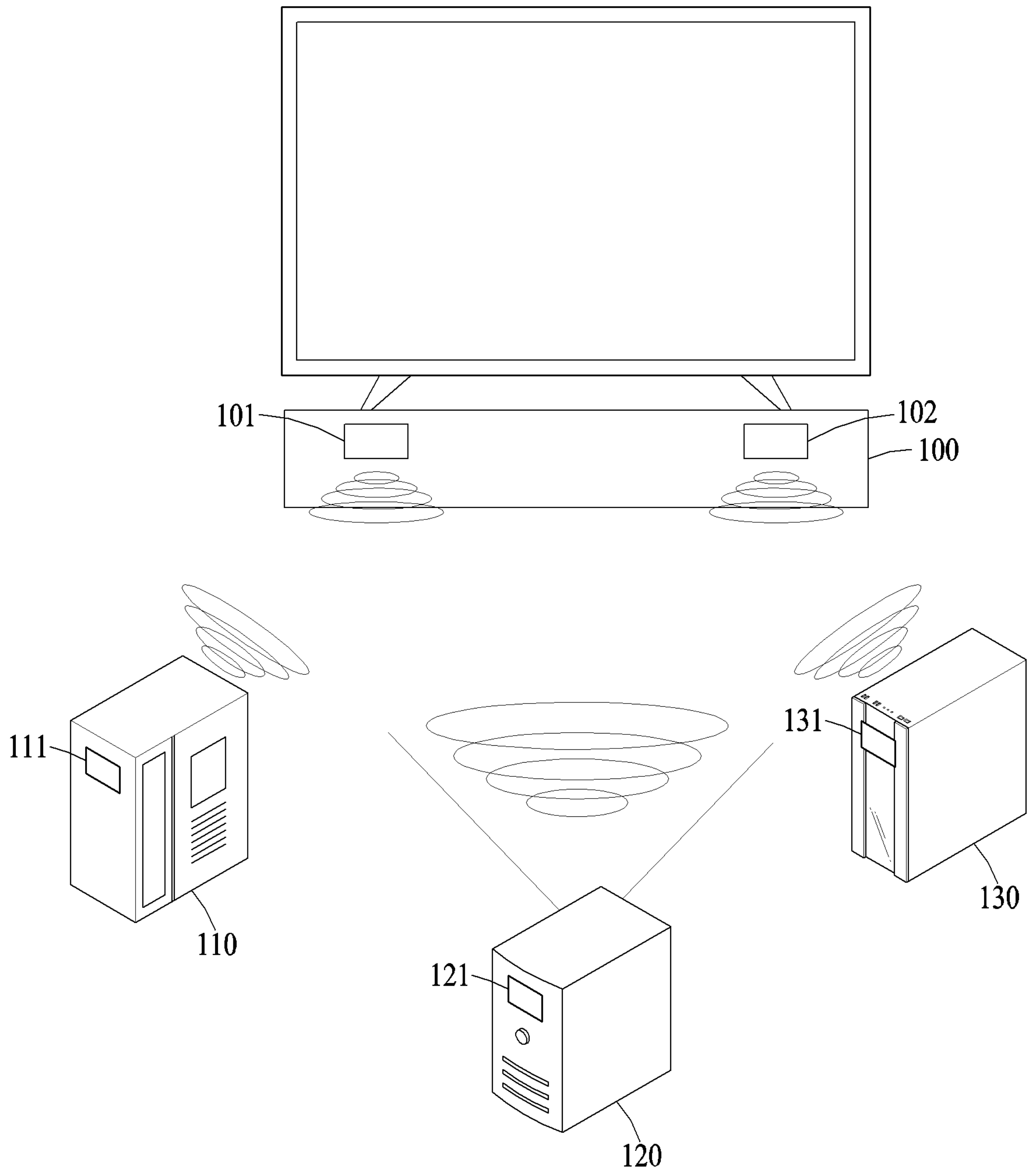
FIG. 1 is a diagram illustrating a schematic configuration of an audio system according to an embodiment.

Hereinafter, embodiments will be described in detail with reference to the accompanying drawings. However, various alterations and modifications may be made to the embodiments. Here, the embodiments are not meant to be limited by the descriptions of the disclosure. The embodiments should be understood to include all changes, equivalents, and replacements within the idea and the technical scope of the disclosure.

The terminology used herein is for the purpose of describing particular embodiments only and is not to be limiting of the embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which the embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the embodiments with reference to the accompanying drawings, like reference numerals refer to like constituent elements and a repeated description related thereto will be omitted. In the description of embodiments, detailed description of well-known related structures or functions will be omitted when it is deemed that such description will cause ambiguous interpretation of the disclosure.

Also, in the description of the components, terms such as first, second, A, B, (a), (b) or the like may be used herein when describing components of the disclosure. These terms are used only for the purpose of discriminating one component from another component, and the nature, the sequences, or the orders of the components are not limited by the terms. When one component is described as being "connected", "coupled", or "attached" to another component, it should be understood that one component may be connected or attached directly to another component, and an intervening component may also be "connected", "coupled", or "attached" to the components.

Embodiments herein may be described and illustrated in terms of blocks which carry out a described function or functions. These blocks, which may be referred to herein as units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by a firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. However, the disclosure is not limited thereto, and as such, the blocks, which may be referred to herein as units, modules, or the like, may include software modules implemented by software codes, program codes, software instructions, or the like. The software modules may be executed on one or more processors.

The same name may be used to describe an element included in the embodiments described above and an element having a common function. Unless otherwise mentioned, the descriptions on the embodiments may be applicable to the following embodiments and thus, duplicated descriptions will be omitted for conciseness.

Hereinafter, a device and method for expanding 7-channel audio using wireless transmission according to an embodiment of the disclosure is described in detail with reference to FIGS. 1 to 4.

FIG. 1 is a diagram illustrating a schematic configuration of an audio system according to an embodiment.

Referring to FIG. 1, the audio system may be configured to include a main audio device 100, a first auxiliary audio device 110, a second auxiliary audio device 120, and a third auxiliary audio device 130. According to an embodiment, the main audio device 100 may be referred to as a primary audio device, and the auxiliary audio devices may be referred to as secondary audio devices. According to another embodiment, the main audio device 100 may be referred to as a first audio device, the first auxiliary audio devices may be referred to as a second audio device, the second auxiliary audio devices may be referred to as a third audio device, and the third auxiliary audio devices may be referred to as a fourth audio device. However, the disclosure is not limited thereto, and as such, according to an embodiment, a number of auxiliary audio device may be different than three.

The main audio device 100 may include a first transmission module 101 and a second transmission module 102. The first transmission module 101 may be configured to transmit a first wireless audio signal including audio data corresponding to a plurality of first channels and the second transmission module 102 configured to transmit a second wireless audio signal including audio data corresponding to a plurality of second channels different from the plurality of first channels. For example, the first transmission module 101 may be configured to transmit a first wireless audio signal including audio data corresponding to four channels and the second transmission module 102 configured to transmit a second wireless audio signal including audio data corresponding to three channels different from the four channels. The main audio device 100 may transmit audio data of the four channels through the first transmission module 101 and may transmit audio data of the three channels through the second transmission module 102. However, the disclosure is not limited thereto, and as such, according to another embodiment, the plurality of first channels may be different than four, and the plurality of second channels may be different than three. For example, the first transmission module 101 may transmit audio data of more or less than four channels and the second transmission module 102 may transmit audio data of more or less than three channels. According to an embodiment, the main audio device 100 may be implemented as a soundbar. However, the disclosure is not limited thereto, and as such, the main audio device 100 may be implemented in another manner.

The first auxiliary audio device 110 may receive the first wireless audio signal from the first transmission module 101. For example, the first auxiliary audio device 110 may include a first reception module 111 for receiving and extracting audio data corresponding to three channels from the first wireless audio signal. Moreover, the first auxiliary audio device 110 may output the extracted audio data of the three channels. For example, the three channel may be preset channels. Here, the first auxiliary audio device 110 may be implemented as a rear left speaker.

The second auxiliary audio device 120 may receive the first wireless audio signal from the first transmission module 101. For example, the second auxiliary audio device 120 may include a second reception module 121 for receiving and extracting audio data corresponding to one channel from the first wireless audio signal. Moreover, the first auxiliary audio device 110 may output the extracted audio data of the one channel. For example, the one channel may be a preset channel. Here, the second auxiliary audio device 120 may be implemented as a sub-woofer speaker.

The third auxiliary audio device 130 may receive the second wireless audio signal from the second transmission module 102. For example, the third auxiliary audio device 130 may include a third reception module 131 for receiving and extracting audio data corresponding to three channels from the second wireless audio signal. Moreover, the third auxiliary audio device 130 may output the extracted audio data of the three channels. For example, the three channel may be preset channels. Here, the third auxiliary audio device 130 may be implemented as a rear right speaker.

Figure 2:
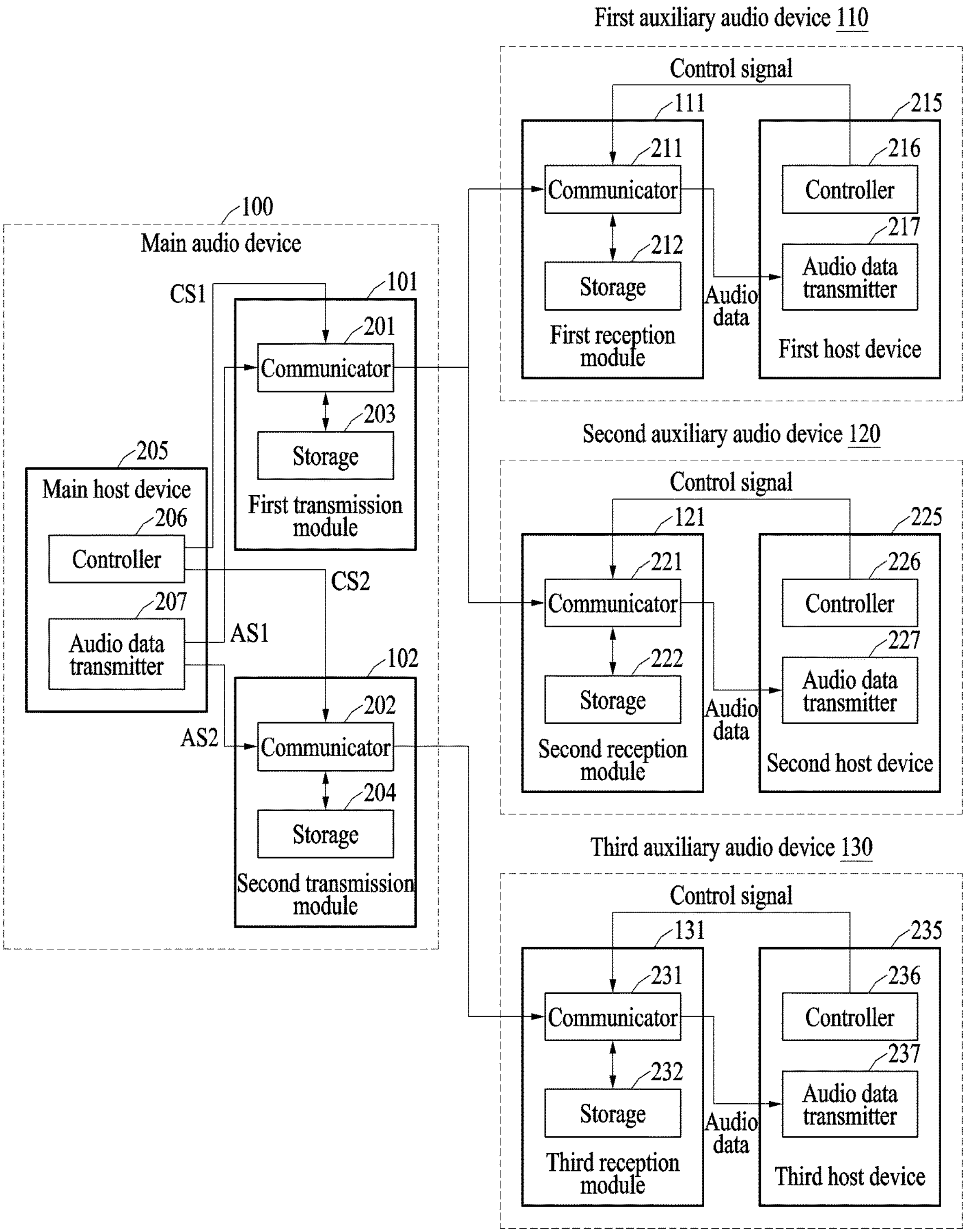
FIG. 2 is a diagram illustrating a configuration of an audio system according to an embodiment.

FIG. 2 is a diagram illustrating a configuration of an audio system according to an embodiment.

Referring to FIG. 2, the audio system may be configured to include the main audio device 100, the first auxiliary audio device 110, the second auxiliary audio device 120, and the third auxiliary audio device 130.

According to an embodiment, the main audio device 100 may include a main host device 205, the first transmission module 101, and the second transmission module 102.

Here, the main host device 205 may be configured to transmit a control signal and an audio signal. For example, the main host device 205 may output a control signal for controlling an operation of the first transmission module 101 and the second transmission module 102. Moreover, the main host device 205 may output an audio signal configured to provide audio data corresponding to four channels to the first transmission module 101 and audio data corresponding to three channels to the second transmission module 102.

According to an embodiment, the control signal may be a first control signal CS1 for designating a transmission module to operate as the first transmission module 101 or a second control signal CS2 for designating a transmission module to operate as the second transmission module 102.

The main host device 205 may be configured to include a controller 206 and an audio data transmitter 207. According to an embodiment, the controller 206 and the audio data transmitter 207 may be implemented by a plurality of electrical components and circuitry. For example, the controller 206 may be a processor. For example, the controller 206 may be implemented as semiconductor chip. However, the disclosure is not limited thereto, and as such, the controller 206 may be implemented in another manner.

The controller 206 may transmit the first control signal CS1 for designating the first transmission module 101 and the second control signal CS2 the second transmission module 102. Here, the control signal may be transmitted through a general-purpose input/output (GPIO) line. However, the disclosure is not limited thereto, and as such, according to another embodiment, the control signal may be transmitted in another manner.

According to an embodiment, the audio data transmitter 207 may transmit a first audio signal AS1 to the first transmission module 101 and transmit a second audio signal AS2 to the second transmission module 102. For example, the first audio signal AS1 may include first audio data corresponding to the first auxiliary audio device 110 and the second auxiliary audio device 120 and the second audio signal AS2 may include second audio data corresponding to the third auxiliary audio device 130. For example, the audio data transmitter 207 may provide audio data output through the first auxiliary audio device 110 and the second auxiliary audio device 120 to the first transmission module 101 and may provide audio data output through the third auxiliary audio device 130 to the second transmission module 102. Here, the audio data may be transmitted through a communication interface of Inter-IC Sound (I2S). However, the disclosure is not limited thereto, and as such, according to another embodiment, the audio data may be transmitted in another manner.

The first transmission module 101 may be configured to include a storage 203 and a communicator 201. According to an embodiment, the communicator 201 may be implemented by a plurality of electrical components and circuitry.

Here, the storage 203 may store firmware for a transmission module. According to an embodiment, the storage 203 may include storage media configured to storing data.

According to an embodiment, in accordance with the firmware for a transmission module, in an example case in which the control signal received from the main host device 100 is a signal to operate in a left mode, the communicator 201 may establish connection with the first reception module 111 and the second reception module 121 and may transmit a first wireless audio signal including the audio data corresponding to the four channels to the first reception module 111 and the second reception module 121. Here, the control signal may be a preset signal for designating a transmission module to operate as a left transmission module (a left mode) for communicating with a rear left speaker and a sub-woofer speaker.

Here, in an example case in which the first transmission module 101 has not established a connection with the first reception module 111 and the second reception module 121, a communication connection between the first transmission module 101 and the first reception module 111 may be performed and a communication connection between the first transmission module 101 and the second reception module 121 may be performed through pairing.

Here, the first wireless audio signal transmitted to the first reception module 111 and the second reception module 121 may include audio data corresponding to a rear left channel output from the rear left of a user in all directions, audio data corresponding to a rear top left channel output from the rear left of the user in an up direction, audio data corresponding to a rear side left channel output from the rear left of the user in a lateral direction, and audio data corresponding to a sub-woofer channel corresponding to low-pitched sound.

The second transmission module 102 may be configured to include a storage 204 and a communicator 202. According to an embodiment, the communicator 202 may be implemented by a plurality of electrical components and circuitry.

Here, the storage 204 may store firmware for a transmission module.

According to an embodiment, in accordance with the firmware for a transmission module, in an example case in which the control signal received from the main host device 100 is a signal to operate in a right mode, the communicator 202 may establish a connection with the third reception module 131 and may transmit a second wireless audio signal including the audio data corresponding to the three channels to the third reception module 131. Here, the control signal may be a preset signal for designating a transmission module to operate as a right transmission module (a right mode) for communicating with a rear right speaker.

Here, the channels included in the first and second wireless audio signals are different channels.

Here, in an example case in which the second transmission module 102 has not established a connection with the third reception module 131, a communication connection between the second transmission module 102 and the third reception module 131 may be performed through pairing.

Here, the audio data corresponding to the three channels included in the second wireless audio signal transmitted to the third reception module 131 may include audio data corresponding to a rear right channel output from the rear right of a user in all directions, audio data corresponding to a rear top right channel output from the rear right of the user in an up direction, and audio data corresponding to a rear side right channel output from the rear right of the user in a lateral direction.

The first auxiliary audio device 110 may be configured to include a first host device 215 and the first reception module 111. According to an embodiment, the first host device 215 and the first reception module 111 may be implemented by a plurality of electrical components and circuitry.

The first host device 215 of the first auxiliary audio device 110 may transmit a control signal for controlling an operation of the first reception module 111 For example, the first host device 215 may receive the audio data corresponding to the three channels from the first reception module 111, and may output the audio data corresponding to the three channels received the first reception module 111. The first host device 215 may be configured to include a controller 216 and an audio data receiver 217. According to an embodiment, the controller 216 and the audio data receiver 217 may be implemented by a plurality of electrical components and circuitry. For example, the controller 216 may be a processor. For example, the controller 216 may be implemented as semiconductor chip. However, the disclosure is not limited thereto, and as such, the controller 216 may be implemented in another manner.

The controller 216 may transmit a control signal for designating a reception module to operate as the first reception module 111.

The audio data receiver 217 may receive the audio data corresponding to the three channels from the first reception module 111 and may output the audio data corresponding to the three channels received.

The first reception module 111 of the first auxiliary audio device 110 may be configured to include a storage 212 and a communicator 211. According to an embodiment, the communicator 211 may be implemented by a plurality of electrical components and circuitry.

The storage 212 may store firmware for a reception module.

In accordance with the firmware for a reception module, in an example case in which the control signal received from the first host device 215 is a signal to operate in a rear left mode, the communicator 211 may establish a connection with the first transmission module 101, may receive the first wireless audio signal from the first transmission module 101, and may provide the audio data corresponding to the three channels preset from the first wireless audio signal to the first host device 215.

The audio data corresponding to the three preset channels extracted from the communicator 211 may be audio data corresponding to a rear left channel output from the rear left of a user in all directions, audio data corresponding to a rear top left channel output from the rear left of the user in an up direction, and audio data corresponding to a rear side left channel output from the rear left of the user in a lateral direction.

The second auxiliary audio device 120 may be configured to include a second host device 225 and the second reception module 121.

The second host device 225 of the second auxiliary audio device 120 may transmit a control signal to control one or more operations of the second reception module 121, receive audio data corresponding to one channel from the second reception module 121, and output the audio data corresponding to the one channel received. The second host device 225 may be configured to include a controller 226 and an audio data receiver 227. According to an embodiment, the controller 226 and the audio data receiver 227 may be implemented by a plurality of electrical components and circuitry. For example, the controller 226 may be a processor. For example, the controller 226 may be implemented as semiconductor chip. However, the disclosure is not limited thereto, and as such, the controller 226 may be implemented in another manner.

The controller 226 may transmit a control signal for designating a reception module to operate as the second reception module 121.

The audio data receiver 227 may receive the audio data corresponding to the one channel from the second reception module 121 and may output the audio data corresponding to the one channel received.

The second reception module 121 of the second auxiliary audio device 120 may be configured to include a storage 222 and a communicator 221. According to an embodiment, the communicator 221 may be implemented by a plurality of electrical components and circuitry.

The storage 222 may store firmware for a reception module.

In accordance with the firmware for a reception module, in an example case in which the control signal received from the second host device 225 is a signal to operate in a sub-woofer mode, the communicator 221 may establish a connection with the first transmission module 101, may receive the first wireless audio signal from the first transmission module 101, and may provide the audio data corresponding to the one channel preset from the first wireless audio signal to the second host device 225.

The audio data corresponding to the one preset channel extracted from the communicator 221 may be the audio data corresponding to the sub-woofer channel corresponding to low-pitched sound.

The third auxiliary audio device 130 may be configured to include a third host device 225 and the first reception module 131.

The third host device 225 of the third auxiliary audio device 130 may transmit a control signal control one or more operations of the third reception module 131, receive the audio data corresponding to the three channels from the third reception module 131, and output the audio data corresponding to the three channels received. The third host device 235 may be configured to include a controller 236 and an audio data receiver 237. According to an embodiment, the controller 236 and the audio data receiver 237 may be implemented by a plurality of electrical components and circuitry. For example, the controller 236 may be a processor. For example, the controller 236 may be implemented as semiconductor chip. However, the disclosure is not limited thereto, and as such, the controller 236 may be implemented in another manner.

The controller 236 may transmit a control signal for designating a reception module to operate as the third reception module 131.

The audio data receiver 237 may receive the audio data corresponding to the three channels from the third reception module 131 and may output the audio data corresponding to the three channels received.

The third reception module 131 of the third auxiliary audio device 130 may be configured to include a storage 232 and a communicator 231. According to an embodiment, the communicator 231 may be implemented by a plurality of electrical components and circuitry.

The storage 232 may store firmware for a reception module.

In accordance with the firmware for a reception module, in an example case in which the control signal received from the third host device 235 is a signal to operate in a rear right mode, the communicator 231 may establish a connection with the second transmission module 102, may receive the second wireless audio signal from the second transmission module 102, and may provide the audio data corresponding to the three channels preset from the second wireless audio signal to the third host device 235.

The audio data corresponding to the three preset channels extracted from the communicator 231 may include audio data corresponding to a rear right channel output from the rear right of a user in all directions, audio data corresponding to a rear top right channel output from the rear right of the user in an up direction, and audio data corresponding to a rear side right channel output from the rear right of the user in a lateral direction.

Furthermore, the first transmission module 101, the second transmission module 102, the first reception module 111, the second reception module 121, and the third reception module 131 may all be configured as the same module.

However, in an example case in which the firmware installed in the module is for a transmission module, the module may operate as a transmission module, and in an example case in which the firmware installed in the module is for a reception module, the module may operate as a reception module.

According to an embodiment, depending on the control signal received by the transmission module, the transmission module may be designated as the first transmission module 101 or the second transmission module 102, and depending on the control signal received by the reception module, the reception module may be designated as the first reception module 111, the second reception module 121, or the third reception module 131.

According to an embodiment, two or more modules of the disclosure may communicate with each other using a five gigahertz (GHz) wireless fidelity (Wi-Fi) band or Wi-Fi free channel. However, the disclosure is not limited hereto, and as such, according to another embodiment, two or more modules of the disclosure may communicate with each other through one of Bluetooth, Bluetooth Low Energy, Zigbee, and short distance communication (e.g., near field communication (NFC)) other than Bluetooth.

Hereinafter, a method according to the disclosure configured as described above is described with reference to the drawings below.

Figure 3:
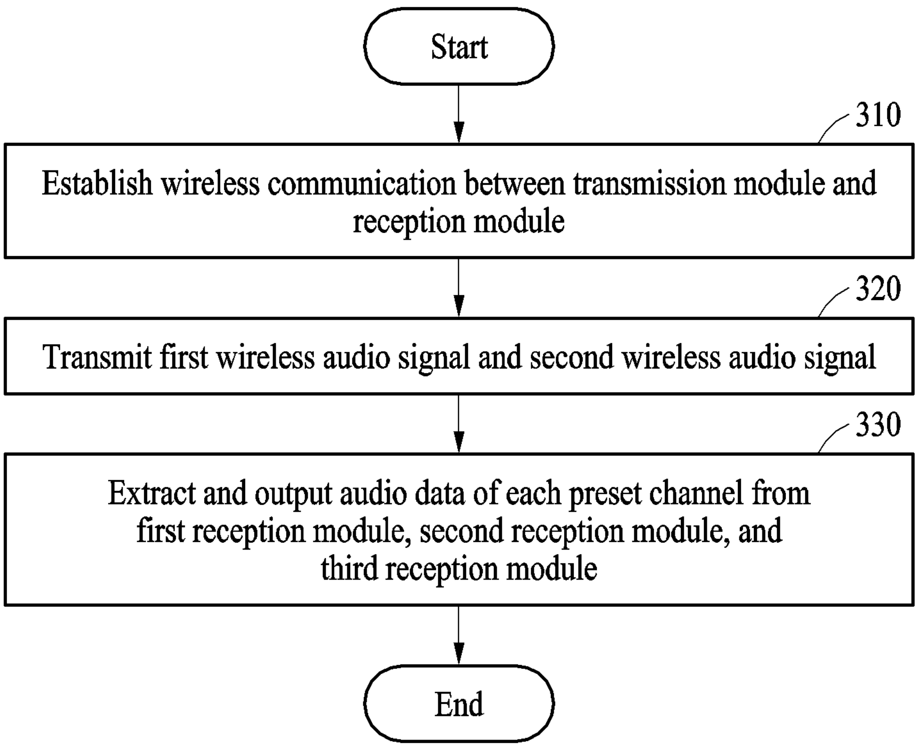
FIG. 3 is a diagram illustrating a process of wirelessly transmitting 7 channels in an audio system according to an embodiment.

FIG. 3 is a diagram illustrating a method of wirelessly transmitting 7 channels in an audio system according to an embodiment.

Referring to FIG. 3, in operation 310, the method may include establishing a wireless communication between the transmission modules and the reception modules. For example, the audio system may establish a wireless communication between the first transmission module 101 and the first reception module 111, may establish a wireless communication between the first transmission module 101 and the second reception module 121, and may establish a wireless communication between the second transmission module 102 and the third reception module 131.

In an example case in which a wireless communication has not been established between the transmission modules and the reception modules, the audio system may perform a pairing operation to establish a wireless communication.

According to an embodiment, in operation 320, the method may include transmitting first wireless audio signals and second wireless audio signals. For example, the audio system may transmit, through the first transmission module 101, a first wireless audio signal including audio data corresponding to four channels to the first reception module 111 and the second reception module 121 and may transmit, through the second transmission module 102, a second wireless audio signal including audio data corresponding to three channels to the third reception module 131. Here, the channels included in the first and second wireless audio signals are different channels.

Here, the audio data corresponding to the four channels included in the first wireless audio signal transmitted from the first transmission module 101 to the first reception module 111 and the second reception module 121 may include audio data corresponding to a rear left channel output from the rear left of a user in all directions, audio data corresponding to a rear top left channel output from the rear left of the user in an up direction, audio data corresponding to a rear side left channel output from the rear left of the user in a lateral direction, and audio data corresponding to a sub-woofer channel corresponding to low-pitched sound.

Here, the audio data corresponding to the three channels included in the second wireless audio signal transmitted from the second transmission module 102 to the third reception module 131 may include audio data corresponding to a rear right channel output from the rear right of a user in all directions, audio data corresponding to a rear top right channel output from the rear right of the user in an up direction, and audio data corresponding to a rear side right channel output from the rear right of the user in a lateral direction.

According to an embodiment, in operation 330, the audio system may extract and output audio data of a preset channel through the first reception module 111, the second reception module 121, and the third reception module 131.

For example, as a rear left speaker, the first auxiliary audio device 110 including the first reception module 111 may receive and output audio data corresponding a rear left channel, a rear top left channel, and a rear side left channel.

For example, as a sub-woofer speaker, the second auxiliary audio device 120 including the second reception module 121 may receive and output the audio data corresponding to the sub-woofer channel.

For example, as a rear right speaker, the third auxiliary audio device 130 including the third reception module 131 may receive and output audio data corresponding a rear right channel, a rear top right channel, and a rear side right channel.

According to another embodiment, audio of five wireless channels may also be expanded using the above-mentioned module. An example of expanding audio of five wireless channels using the above-mentioned module is described below with reference to FIG. 4.

Figure 4:
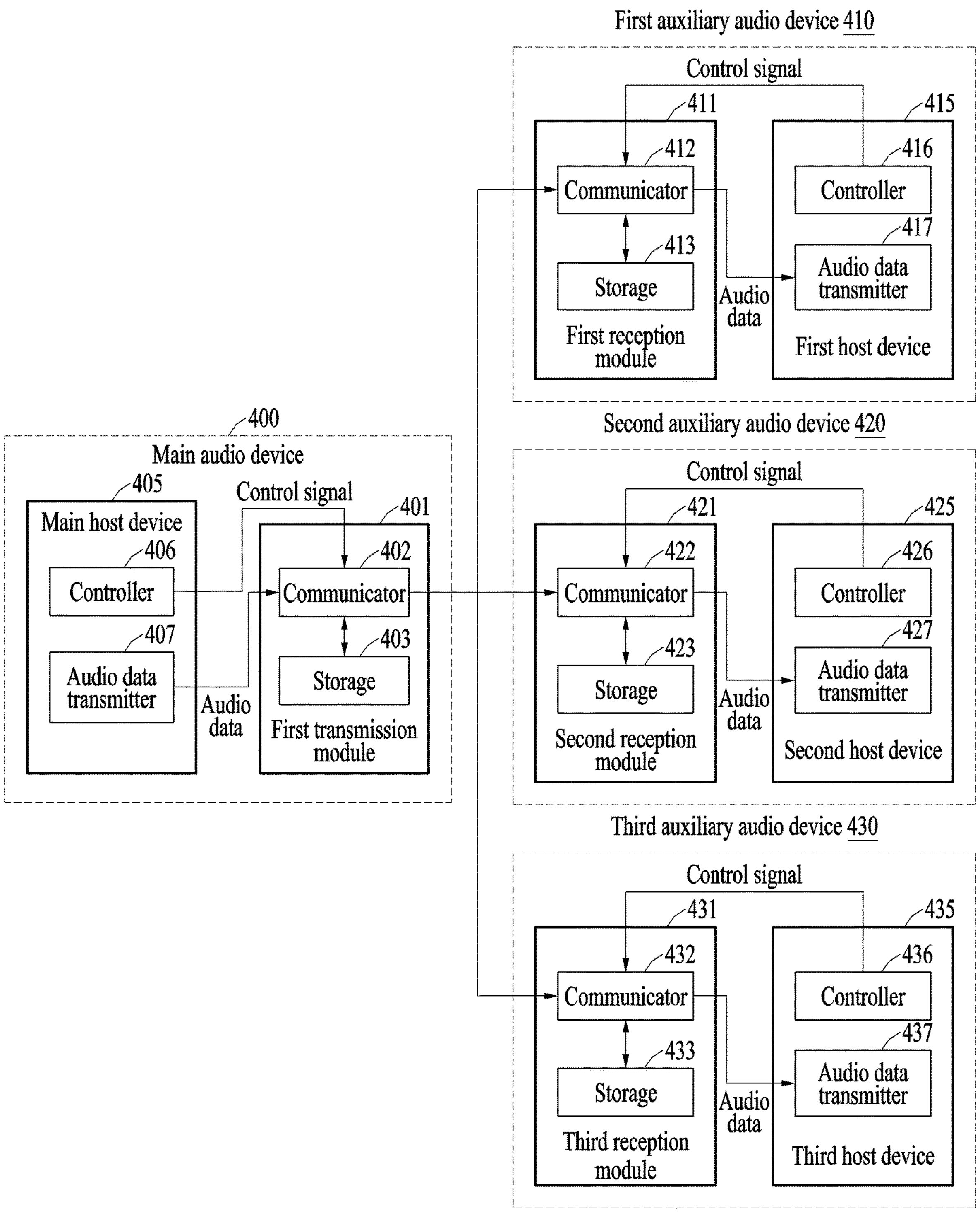
FIG. 4 is a diagram illustrating a configuration of an audio system according to another embodiment.

FIG. 4 is a diagram illustrating a configuration of an audio system according to another embodiment.

Referring to FIG. 4, the audio system may be configured to include a main audio device 400, a first auxiliary audio device 410, a second auxiliary audio device 420, and a third auxiliary audio device 430.

According to an embodiment, the main audio device 400 may be configured to include a main host device 405 and a first transmission module 401.

Here, the main host device 405 may transmit a control signal to control one or more operations of the first transmission module 401 and provide audio data corresponding to five channels to the first transmission module 101. Here, the five channels may include audio data corresponding to a rear left channel output from the rear left of a user in all directions, audio data corresponding to a rear right channel output from the rear right of a user in all directions, audio data corresponding to a rear top left channel output from the rear left of the user in an up direction, audio data corresponding to a rear top right channel output from the rear right of the user in an up direction, and audio data corresponding to a sub-woofer channel corresponding to low-pitched sound.

Here, the control signal may be a signal to designate a transmission module to operate as the first transmission module 401.

The main host device 405 may be configured to include a controller 406 and an audio data transmitter 407. According to an embodiment, the controller 406 and the audio data transmitter 407 may be implemented by a plurality of electrical components and circuitry. For example, the controller 406 may be a processor. For example, the controller 406 may be implemented as semiconductor chip. However, the disclosure is not limited thereto, and as such, the controller 406 may be implemented in another manner.

The controller 406 may transmit a control signal to control one or more operations of the first transmission module 401. Here, the control signal may be transmitted through a GPIO line.

The audio data transmitter 407 may provide, to the first transmission module 401, audio data of the five channels output through the first auxiliary audio device 410, the second auxiliary audio device 420, and the third auxiliary audio device 430. Here, the audio data may be transmitted through a communication interface of I2S.

The first transmission module 401 may be configured to include a storage 403 and a communicator 402. According to an embodiment, the communicator 402 may be implemented by a plurality of electrical components and circuitry. Here, the storage 403 may store firmware for a transmission module.

According to an embodiment, in accordance with the firmware for a transmission module, in an example case in which there is a signal from the main host device 100 to operate in a transmission mode of the five channels, the communicator 402 may establish a connection with the first reception module 411, the second reception module 421, and the third reception module 431 and may transmit a wireless audio signal including the audio data corresponding to the five channels to the first reception module 411, the second reception module 421, and the third reception module 431.

Here, the control signal may be a preset signal for designating a transmission module to communicate with a rear left speaker, a sub-woofer speaker, and a rear right speaker, in an example case in which there is one transmission module.

Here, in an example case in which the first transmission module 401 has not established a connection with the first reception module 411, the second reception module 421, and the third reception module 431, a communication connection between the first transmission module 401 and the first reception module 411 may be performed, a communication connection between the first transmission module 401 and the second reception module 421 may be performed, and a communication connection between the first transmission module 401 and the third reception module 431 may be performed through pairing.

The first auxiliary audio device 410 may be configured to include a first host device 415 and the first reception module 411.

The first host device 415 of the first auxiliary audio device 410 may transmit a control signal to control one or more operations of the first reception module 411, receive the audio data corresponding to two channels from the first reception module 411, and output the audio data corresponding to the two channels received. The first host device 415 may be configured to include a controller 416 and an audio data receiver 417. According to an embodiment, the controller 416 and the audio data receiver 417 may be implemented by a plurality of electrical components and circuitry. For example, the controller 416 may be a processor. For example, the controller 416 may be implemented as semiconductor chip. However, the disclosure is not limited thereto, and as such, the controller 416 may be implemented in another manner.

The controller 416 may transmit a control signal for designating a reception module to operate as the first reception module 411.

The audio data receiver 417 may receive the audio data corresponding to the two channels from the first reception module 411 and may output the audio data corresponding to the two channels received.

The first reception module 411 of the first auxiliary audio device 410 may be configured to include a storage 413 and a communicator 412. According to an embodiment, the communicator 412 may be implemented by a plurality of electrical components and circuitry.

The storage 413 may store firmware for a reception module.

In accordance with the firmware for a reception module, in an example case in which the control signal received from the first host device 415 is a signal to operate in a rear left mode, the communicator 412 may establish a connection with the first transmission module 401, may receive a wireless audio signal from the first transmission module 401, and may provide the audio data corresponding to the two channels preset from the wireless audio signal to the first host device 415.

The audio data corresponding to the two preset channels extracted from the communicator 412 may be audio data corresponding to a rear left channel output from the rear left of a user in all directions and audio data corresponding to a rear top left channel output from the rear left of the user in an up direction.

The second auxiliary audio device 420 may be configured to include a second host device 425 and the second reception module 421.

The second host device 425 of the second auxiliary audio device 420 may transmit a control signal to control one or more operations of the second reception module 421, receive audio data corresponding to one channel from the second reception module 421, and output the audio data corresponding to the one channel received. The second host device 425 may be configured to include a controller 426 and an audio data receiver 427. According to an embodiment, the controller 426 and the audio data receiver 427 may be implemented by a plurality of electrical components and circuitry. For example, the controller 426 may be a processor. For example, the controller 426 may be implemented as semiconductor chip. However, the disclosure is not limited thereto, and as such, the controller 426 may be implemented in another manner.

The controller 426 may transmit a control signal for designating a reception module to operate as the second reception module 121.

The audio data receiver 427 may receive the audio data corresponding to the one channel from the second reception module 421 and may output the audio data corresponding to the one channel received.

The second reception module 421 of the second auxiliary audio device 420 may be configured to include a storage 423 and a communicator 422. According to an embodiment, the communicator 422 may be implemented by a plurality of electrical components and circuitry.

The storage 423 may store firmware for a reception module.

In accordance with the firmware for a reception module, in an example case in which the control signal received from the second host device 425 is a signal to operate in a sub-woofer mode, the communicator 422 may establish a connection with the first transmission module 401, may receive a wireless audio signal from the first transmission module 401, and may provide the audio data corresponding to the one channel preset from the wireless audio signal to the second host device 425.

The audio data corresponding to the one preset channel extracted from the communicator 422 may be the audio data corresponding to the sub-woofer channel corresponding to low-pitched sound.

The third auxiliary audio device 430 may be configured to include a third host device 425 and the first reception module 431.

The third host device 425 of the third auxiliary audio device 430 may transmit a control signal to control one or more operations of the third reception module 431, receive the audio data corresponding to the three channels from the third reception module 431, and output the audio data corresponding to the three channels received. The third host device 425 may be configured to include a controller 436 and an audio data receiver 437. According to an embodiment, the controller 436 and the audio data receiver 437 may be implemented by a plurality of electrical components and circuitry. For example, the controller 436 may be a processor. For example, the controller 436 may be implemented as semiconductor chip. However, the disclosure is not limited thereto, and as such, the controller 436 may be implemented in another manner.

The controller 436 may transmit a control signal for designating a reception module to operate as the third reception module 431.

The audio data receiver 437 may receive the audio data corresponding to the three channels from the third reception module 431 and may output the audio data corresponding to the three channels received.

The third reception module 431 of the third auxiliary audio device 430 may be configured to include a storage 434 and a communicator 432. According to an embodiment, the communicator 432 may be implemented by a plurality of electrical components and circuitry.

The storage 434 may store firmware for a reception module.

In accordance with the firmware for a reception module, in an example case in which the control signal received from the third host device 435 is a signal to operate in a rear right mode, the communicator 432 may establish a connection with the first transmission module 401, may receive a wireless audio signal from the first transmission module 401, and may provide the audio data corresponding to the two channels preset from the wireless audio signal to the third host device 435.

The audio data corresponding to the two preset channels extracted from the communicator 432 may include audio data corresponding to a rear right channel output from the rear right of a user in all directions and audio data corresponding to a rear top right channel output from the rear right of the user in an up direction.

Furthermore, the first transmission module 401, the first reception module 411, the second reception module 421, and the third reception module 431 may all be configured as the same module.

However, in an example case in which the firmware installed in the module is for a transmission module, the module may operate as a transmission module, and in an example case in which the firmware installed in the module is for a reception module, the module may operate as a reception module.

According to an embodiment, depending on the control signal received by the transmission module, the transmission module may be designated as the first transmission module 401, and depending on the control signal received by the reception module, the reception module may be designated as the first reception module 411, the second reception module 421, or the third reception module 431.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs or DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter. The above-described devices may be configured to act as one or more software modules in order to perform the operations of the above-described embodiments, or vice versa.

The software may include a computer program, a piece of code, an instruction, or some combination thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software may also be distributed over network-coupled computer systems so that the software is stored and executed in a distributed fashion. The software and data may be stored by one or more non-transitory computer-readable recording mediums.

While the embodiments are described with reference to drawings, it will be apparent to one of ordinary skill in the art that various alterations and modifications in form and details may be made in these embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. An audio system comprising:
a main audio device comprising:
a first transmission circuit configured to transmit a first wireless audio signal comprising first audio data corresponding to a plurality of first channels, and
a second transmission circuit configured to transmit a second wireless audio signal comprising second audio data corresponding to a plurality of second channels different from the plurality of first channels;
a first auxiliary audio device comprising a first reception circuit configured to:
receive the first wireless audio signal from the first transmission circuit and extract third audio data corresponding to three channels among the plurality of first channels from the first wireless audio signal;
a second auxiliary audio device comprising a second reception circuit configured to:
receive the first wireless audio signal from the first transmission circuit and extract fourth audio data corresponding to one channel among the plurality of first channels, different from the three channels among the plurality of first channels, from the first wireless audio signal; and
a third auxiliary audio device comprising a third reception circuit configured to:
receive the second wireless audio signal from the second transmission circuit and extract fifth audio data corresponding to three channels among the plurality of second channels from the second wireless audio signal,
wherein the plurality of first channels comprises four channels and the plurality of second channels comprises three channels, and
wherein the first auxiliary audio device is configured to extract three channels from the four channels, the second auxiliary audio device is configured to extract one channel from the four channels, and the third auxiliary audio device is configured to extracts all three channels among the plurality of second channels.

2. The audio system of claim 1, wherein
the main audio device comprises a main host device configured to:
transmit a control signal for controlling an operation of the first transmission circuit and the second transmission circuit,
transmit the first audio data corresponding to the plurality of first channels to the first transmission circuit, and
transmit the second audio data corresponding to the plurality of second channels to the second transmission circuit.

3. The audio system of claim 2, wherein
the main host device comprises:
a controller configured to transmit the control signal the first transmission circuit and the second transmission circuit; and
an audio data transmitter configured to transmit the first audio data and the second audio data.

4. The audio system of claim 2, wherein
the first transmission circuit comprises:
a storage configured to store firmware for operating a transmission module; and
a communication circuit configured to:
establish a connection with the first reception circuit and the second reception circuit, and
transmit the first wireless audio signal to the first reception circuit and the second reception circuit, based on the control signal received from the main host device being a signal to operate in a left mode.

5. The audio system of claim 2, wherein
the second transmission circuit comprises:
a storage configured to store firmware for operating a transmission module; and
a communication circuit configured to:
establish a connection with the third reception circuit, and
transmit the second wireless audio signal to the third reception circuit, based on the control signal received from the main host device being a signal to operate in a right mode.

6. The audio system of claim 1, wherein
the first audio data corresponding to the plurality of first channels comprises:
audio data corresponding to a rear left channel output from the rear left of a user in all directions;

audio data corresponding to a rear top left channel output from the rear left of the user in an up direction;

audio data corresponding to a rear side left channel output from the rear left of the user in a lateral direction; and audio data corresponding to a sub-woofer channel corresponding to low-pitched sound.

7. The audio system of claim 1, wherein the second audio data corresponding to the plurality of second channels comprises:

audio data corresponding to a rear right channel output from the rear right of a user in all directions;

audio data corresponding to a rear top right channel output from the rear right of the user in an up direction; and audio data corresponding to a rear side right channel output from the rear right of the user in a lateral direction.

8. The audio system of claim 1, wherein the first auxiliary audio device comprises a first auxiliary host device configured to:

transmit a control signal for controlling the first reception circuit, and receive the third audio data corresponding to the three channels among the plurality of first channels from the first reception circuit.

9. The audio system of claim 8, wherein the first reception circuit comprises:

a storage configured to store firmware for operating a reception module; and a communication circuit configured to:

establish a connection with the first transmission circuit, receive the first wireless audio signal from the first transmission circuit, and extract the third audio data corresponding to the three channels among the plurality of first channels from the first wireless audio signal to provide the extracted audio data to the first auxiliary host device, based on the control signal received from the first auxiliary host device being a signal to operate in a rear left mode.

10. The audio system of claim 1, wherein the second auxiliary audio device comprises a second auxiliary host device configured to:

transmit a control signal for controlling the second reception circuit and receive the fourth audio data corresponding to the one channel among the plurality of first channels from the second reception circuit.

11. The audio system of claim 10, wherein the second reception circuit comprises:

a storage configured to store firmware for operating a reception module; and a communication circuit configured to:

establish a connection with the first transmission circuit, receive the first wireless audio signal from the first transmission circuit, and extract the fourth audio data corresponding to the one channel among the plurality of first channels from the first wireless audio signal to provide the extracted audio data to the second auxiliary host device, based on the control signal received from the second auxiliary host device being a signal to operate in a sub-woofer mode.

12. The audio system of claim 1, wherein the third auxiliary audio device comprises a third auxiliary host device configured to:

transmit a control signal for controlling the third reception circuit and receive the fifth audio data corresponding to the three channels among the plurality of second channels from the third reception circuit.

13. The audio system of claim 12, wherein the third reception circuit comprises:

a storage configured to store firmware for operating a reception module; and a communication circuit configured to:

establish a connection with the second transmission circuit, receive the second wireless audio signal from the second transmission circuit, and extract the fifth audio data corresponding to the three channels among the plurality of second channels from the second wireless audio signal to provide the extracted audio data to the third auxiliary host device, based on the control signal received from the third auxiliary host device being a signal to operate in a rear right mode.

14. The audio system of claim 1, wherein the first transmission circuit, the second transmission circuit, the first reception circuit, the second reception circuit, and the third reception circuit are all configured in a same module, wherein the module is configured to:

operate as a transmission module based on a control signal received from the main audio device, or a control signal received; or operate as a reception module based on control signal received from the main audio device.

15. The audio system of claim 1, wherein the first transmission circuit is configured to establish a wireless communication connection with both the first reception circuit and the second reception circuit, and transmit the first wireless audio signal to the first reception circuit and the second reception circuit.

16. The audio system of claim 1, wherein the second transmission circuit is configured to establish a wireless communication connection with the third reception circuit, among the first reception circuit, the second reception circuit, and the third reception circuit, and transmit the second wireless audio signal to the third reception circuit.

17. The audio system of claim 1, wherein the second transmission circuit is configured to transmit the second wireless audio signal, and only the third reception circuit is configured to receive and extract audio data from the second wireless audio signal.

18. A method of expanding 7-channel audio using wireless transmission in an audio system, the method comprising:

establishing a wireless communication between a first transmission circuit and a first reception circuit, establishing a wireless communication between the first transmission circuit and a second reception circuit, and establishing a wireless communication between a second transmission circuit and a third reception circuit;

transmitting, by the first transmission circuit, a first wireless audio signal comprising first audio data corresponding to a plurality of first channels;

transmitting, by the second transmission circuit, a second wireless audio signal comprising second audio data corresponding to a plurality of second channels different from the plurality of first channels;

receiving, by the first reception circuit, the first wireless audio signal from the first transmission circuit and extracting third audio data corresponding to three channels among the plurality of first channels from the first wireless audio signal;

receiving, by the second reception circuit, the first wireless audio signal from the first transmission circuit and extracting fourth audio data corresponding to one channel among the plurality of first channels, different from the three channels among the plurality of first channels, from the first wireless audio signal; and receiving, by the third reception circuit, the second wireless audio signal from the second transmission circuit and extracting fifth audio data corresponding to three channels among the plurality of second channels from the second wireless audio signal, wherein the plurality of first channels comprises four channels and the plurality of second channels comprises three channels, and wherein the first reception circuit extracts three channels from the four channels, the second reception circuit extracts one channel from the four channels, and the third reception circuit extracts all three channels among the plurality of second channel.

* * * * *